United States Patent
Banerjee et al.

(10) Patent No.: US 7,464,369 B1
(45) Date of Patent: Dec. 9, 2008

(54) SYSTEM AND METHOD FOR CUSTOMIZING EXTENSIBLE WEB PART MENUS

(75) Inventors: Nilanjan Banerjee, Seattle, WA (US); Stephen I. Lesser, Redmond, WA (US); Gregory Scott Lindhorst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 10/659,845

(22) Filed: Sep. 11, 2003

(51) Int. Cl.
*G06F 9/44* (2006.01)
*G06F 17/00* (2006.01)

(52) U.S. Cl. .................. 717/106; 715/209; 715/243; 715/246

(58) Field of Classification Search .................. None
See application file for complete search history.

(56) References Cited

U.S. PATENT DOCUMENTS

| | | | |
|---|---|---|---|
| 7,325,196 B1* | 1/2008 | Covington et al. | 715/251 |
| 7,325,197 B1* | 1/2008 | Massena et al. | 715/251 |
| 2004/0060036 A1* | 3/2004 | Natori et al. | 717/100 |
| 2004/0268228 A1* | 12/2004 | Croney et al. | 715/505 |
| 2005/0108647 A1* | 5/2005 | Musson et al. | 715/744 |
| 2006/0010196 A1* | 1/2006 | Laird et al. | 709/203 |
| 2006/0242557 A1* | 10/2006 | Nortis, III | 715/509 |
| 2007/0022419 A1* | 1/2007 | Subbarao et al. | 717/173 |
| 2007/0044023 A1* | 2/2007 | Carter et al. | 715/727 |

OTHER PUBLICATIONS

Sun Microsystems, Inc., "How to Use Menu", Feb. 7, 2003, Sun Microsystems, pp. 1-10.*

* cited by examiner

*Primary Examiner*—Eric B Kiss
*Assistant Examiner*—Ben C Wang
(74) *Attorney, Agent, or Firm*—Merchant & Gould

(57) ABSTRACT

A system and method that allows Web Part developers to customize Extensible Web Part Menus by programmatically adding, deleting, or modifying the commands that appear in the Extensible Web Part Menu. The customization may be performed by the Web Part developer either through a portal page on a server platform or on a client platform. Once the customization to the Extensible Web Part Menu is complete, the Web Part renders the customized Extensible Web Part Menu in a manner that is completely integrated into the rest of the Web Part on the portal page.

14 Claims, 5 Drawing Sheets

SYSTEM AND METHOD FOR CUSTOMIZING EXTENSIBLE WEB PART MENUS

TECHNICAL FIELD

The present invention is directed to Extensible Web Part Menus and more particularly to customizing Extensible Web Part Menus.

BACKGROUND OF THE INVENTION

In this age of information overload, one of the biggest hurdles that Web Page designers face is finding, consolidating, and sharing mission-critical information in a single, easy-to-access Web portal page. Digital dashboards and the applications that host them, such as Microsoft® SharePoint™ Portal Server and Microsoft® Windows™ SharePoint™ Services (WSS) Server, are helping to make these tasks easier.

Digital dashboards are customized portals that consolidate personal and business information into one location and benefit businesses by reducing the time and effort needed to locate and manage information from multiple sources. Information in digital dashboards can come from internal or external sources, and can be accessed online or offline. Best of all, digital dashboards can be highly interactive, allowing for dynamic information management and analysis. Knowledge workers can view and interact with digital dashboards by using applications such as Microsoft® Internet Explorer.

Web Parts are the core building blocks of digital dashboard. Web Parts use technologies such as Extensible Markup Language (XML), Hypertext Markup Language (HTML), and scripts on Active Server Pages (ASPs) to render componentized information in digital dashboards. The use of Web Parts has lead to a new title for the knowledge workers who design them: Web Part developers.

When Web Part developers create Web Parts for use with a Web portal, there may be instances in which the Web Part developers may need to manipulate portions of the Web Part User Interface (UI). For example, each time a Web Part developer inserts a new Web Part on the Web page, it may be necessary to customize the menu commands for that particular Web Part. Typically, a standard menu, which contains a standard set of default commands, is displayed for each Web Part on the Web portal page, regardless of the type of Web Part.

For example, a standard set of default commands may include a MINIMIZE/RESTORE command, a CLOSE command, a DELETE command, a MODIFY MY WEB PART command, an EXPORT command, and a HELP command. Thus, the same menu is displayed for a "map" Web Part and for a "search" Web Part and a "table" Web Part. Unfortunately, the standard default commands may not be applicable to every type of Web Part. For example, if a Web Part developer creates a Web Part to display graphical images, he or she may not want the user to be able to export the image to another application program and therefore may want to eliminate or disable the EXPORT command. Similarly, if a Web Part contains a map image, the Web Part developer may want to provide the user with a ZOOM IN command and a ZOOM OUT command. However, because the commands are not included in the default command set for a standard menu, the Web Part developer cannot provide them to the user.

Therefore, there is a need for a method to allow Web Part developers to customize the Extensible Web Part Menu for each Web Part. In particular, there is a need for a method to allow Web Part developers to programmatically add, remove, or alter the functionality of the standard default commands in a Web Part's Extensible Web Part Menu on a portal page and render the customized Extensible Web Part Menu in such a manner as to completely integrate it into the rest of the Web Part.

SUMMARY OF THE INVENTION

The present invention meets the needs described above in a method to allow Web Part developers to programmatically add, delete, or modify the commands in a Web Part Extensible Web Part Menu. The customization of the Web Part Extensible Web Part Menu may be performed through a portal page on a server platform or through a Web page in an application program running on a client platform. The Web Part will then render the customized Extensible Web Part Menu in a manner that is completely integrated into the rest of the Web Part on the portal page.

Generally described, the invention includes a method and system that allows a Web Part developer to customize an Extensible Web Part Menu to include commands that are suited to the particular Web Part. The Web Part developer begins by accessing an object model associated with the Web Part through a portal page on a server platform. To customize the Extensible Web Part Menu, the Web Part developer first creates a call that overrides the object model for the default Extensible Menu. Next, the determination is made whether to add a new command. If the Web Part developer determines to add a new command, then the Web Part developer defines the new command and then inserts the command into the Extensible Web Part Menu. The new command may either be added to the end of the Extensible Web Part Menu or inserted between two existing commands. If however, the determination was made not to insert a new command, a second determination is made whether to modify the properties of an existing command. If the Web Part developer determined to modify an existing command, the position of the desired command if first located within the Extensible Web Part Menu. Next, the Web Part developer alters any properties associated with the command by changing the appropriate values of the properties.

However, if the Web Part developer does not want to modify, any of the existing commands, a final determination is made whether to remove an existing command from the Extensible Web Part Menu. If the Web Part developer wants to remove a command, he or she first identifies the position of the command and then places an appropriate call to remove the command from the Extensible Web Part Menu. By using the appropriate call, the Web Part developer may remove either the first instance of the command, every instance of the command, or may elect to remove all of the commands from the Extensible Web Part Menu. Therefore, the Web Part developer has complete control over the Extensible Web Part Menu and is able to customize the commands within the Extensible Web Part Menu to achieve the desired effect.

The various aspects of the present invention may be more clearly understood and appreciated from a review of the following detailed description of the disclosed embodiments and by reference to the appended drawings and claims.

DETAILED DESCRIPTION OF THE INVENTION

Figure 1:
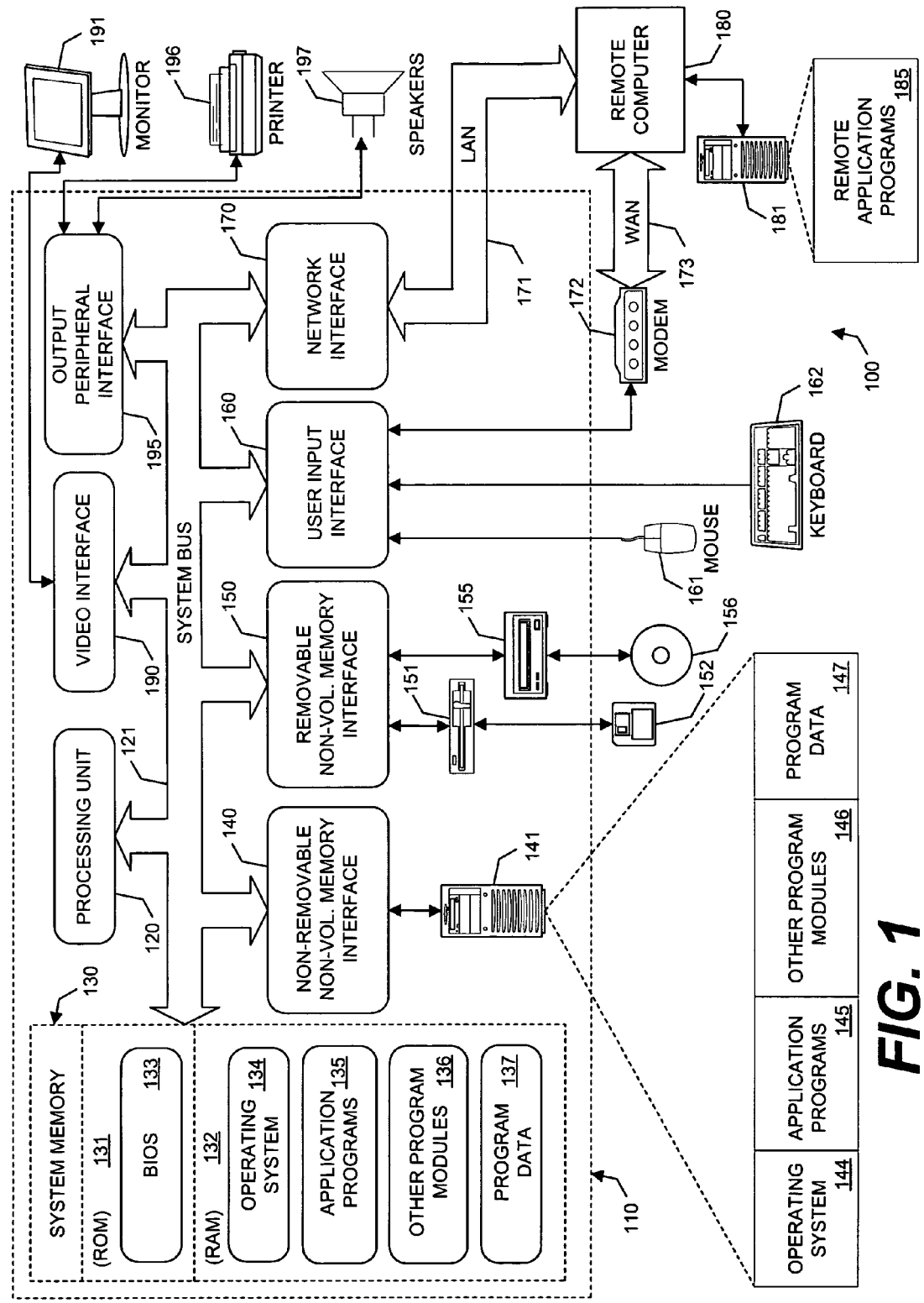
FIG. 1 is a block diagram illustrating a computer that provides the operating environment for the embodiments of the present invention.

The present invention is typically embodied in a Web Part Menu object model. The Web Part developer will be able to customize the content of the Extensible Web Part Menu on the server platform through a Web portal design program, such as the Microsoft® SharePoint™ application program or the Microsoft® SharePoint™ Services. Specifically, the Web Part developer will be able to modify the characteristics of existing commands, add commands in addition to the default commands to the menu items on each Web Part on the portal page, or delete commands from the Extensible Web Part Menu. The customization of the Extensible Web Part Menu occurs by accessing the object model for the Web Part that the Web Part developer wants to customize. The Web Part developer then adds the appropriate code to modify, add, or delete the commands in the default Extensible Web Part Menu. Typically, the object model is written in the C# programming language, however those skilled in the art will appreciate that other programming languages may be used to program the object model without departing from the scope of the invention.

The current commands for the default Extensible Web Part Menu include a MINIMIZE/RESTORE command, a CLOSE command, a DELETE command, a MODIFY MY WEB PART command, an EXPORT command, and a HELP command. Typically, the default Extensible Web Part Menu is downloaded from the server platform only once per visit to a portal page. Therefore, each Web Part on the portal page uses the same default Extensible Web Part Menu unless an Extensible Web Part Menu for a particular Web Part has been modified in the object model on the server platform or the user's rights require modification. For example, the Web Part administrator can limit the user's rights to access each command on the Extensible Web Part Menu. If the Web Part administrator does not give a user the rights or permission to perform a certain command, that particular command may not be displayed in the Extensible Web Part Menu. A summary of the default commands and when they are displayed in the Extensible Web Part Menu is provided in Table 1.

TABLE 1

Summary of Default Commands for Extensible Web Part Menu.

| Menu Item | When Displayed |
| --- | --- |
| Minimize | Rights = Personalize Web Part Page, Author Page( ) FrameState!=Minimize |
| Restore | Rights = Personalize Web Part Page, Author Page( ) FrameState!=Minimize |
| Close | Rights = Personalize Web Part Page, Author Page( ) |
| Delete | Rights = Personalize Web Part Page, Author Page( ) |

TABLE 1-continued

Summary of Default Commands for Extensible Web Part Menu.

| Menu Item | When Displayed |
| --- | --- |
| Modify My Web Part or Modify Shared Web Part | Rights = Personalize Web Part Page, Author Page( ) |
| Export | Rights = Personalize Web Part Page, Author Page( ) |
| Help | Rights = Browse( ) and HelpLink!=Null |

The Web Part developer may customize the Extensible Web Part Menu by modifying the characteristics of the existing commands, adding new commands, or deleting existing commands that are unnecessary for the particular Web Part.

The Web Part developer begins customizing the Extensible Web Part Menu by accessing the object model for the Web Part on the server platform and inserting the appropriate calls to the object model. First, the Web Part developer makes a call to override the CreateWebPartMenu( ) method that creates the default Extensible Web Part Menu. For example, the following C# code may be used to override the CreateWebPartMenu( ) method:

public override void CreateWebPartMenu( )

Next, within the public override void CreateWebPartMenu( ) method, the Web Part developer defines the new command using the MenuItem object. The MenuItem object may be created using the following forms:

MenuItem(displayText, MenuID, OnClick);

MenuItem(displayText, ClientEvent); or

MenuItem(displayText, ClientEvent, MenuID)

where the displayText property is a string that identifies the name of the command as it appears in the Extensible Web Part Menu, the MenuID property is a string that identifies the a unique identifier for the command, the ClientEvent is a Javascript string, which is executed on the client platform when the menu option is selected, and OnClick is an event that occurs on the server platform when the user clicks on the menu command.

The Web Part developer also sets any appropriate properties for the newly created commands. For example, the Web Part developer can specify whether a separator should be displayed above the command with the BeginSection property, or specify that a "check" should be displayed next to the command when the command is selected using the Checked property. A summary of the properties, including the property name, property type, and a description of each property for the MenuItem( ) member is provided in Table 2.

TABLE 2

Summary of Properties used by the MenuItem Object.

| Property | Type | Description |
| --- | --- | --- |
| Enabled | Boolean | "true" if the menu item is enabled; otherwise "false." The default is set to "true." |
| Visible | Boolean | "true" if the command will be made visible on the Extensible Web Part Menu; otherwise, "false." The default is "true." |
| MenuItems | MenuItemCollection | Gets a value indicating the collection of MenuItems objects associated with the Extensible Web Part Menu. |

TABLE 2-continued

Summary of Properties used by the MenuItem Object.

| Property | Type | Description |
|---|---|---|
| IsParent | Boolean | "true" if the command contains a child command; "false" if the command stands alone. The default is "false." |
| Checked | Boolean | "true" if a check should be placed next to the command in the Extensible Web Part Menu when the command is selected; otherwise, "false." The default is "false." |
| Caption | String | The text caption of the command. |
| BeginSection | Boolean | "true" if a separator should be displayed above the command in the Extensible Web Part Menu; otherwise, "false." The default is "false." |
| MenuID | String | A unique identifier for the command item. |
| ClientEvent | String | JavaScript for the click event, which need to be downloaded to the client platform as OnClientClick. |

A summary of the Methods associated with the MenuItem objects is provided in Table 3.

TABLE 3

Summary of the Methods for the MenuItem Object.

| Method | Description |
|---|---|
| OnClick | Raises the Click Event on the server platform. |

Finally, a summary of the Events associated with the MenuItem Object is shown in Table 4.

TABLE 4

Summary of Events used with the MenuItem Object.

| Event | Description |
|---|---|
| Click(Internal) | Occurs when the command is clicked or selected using an access key defined for the command. The Click event occurs during the load, as it must occur before the Extensible Web Part Menu is rendered and cannot occur during the initialization, as all of the server platform controls will not have finished initializing. |

Typically, the commands that the Web Part developer may add may be stored in a standard library. Thus, when the new commands are created, calls to the appropriate subroutine are automatically carried out. However, the present invention allows the Web Part developer to create customized commands that may not be contained in a standard library. In these instances, the Web Part developer may create the necessary subroutines and or function using C#, which will define the action of the customized commands. These subroutines are then saved in the object model and called by the newly created command when the Extensible Web Part Menu is rendered in the Web Part on the Web portal page.

After the new commands for Extensible Web Part Menu are created, the Web Part developer inserts the commands into the Extensible Web Part Menu using the MenuItemCollection method, which has the following form:

MenuItemCollection(Menu Owner)

The MenuItemCollection method has several properties and methods associated with it that are used to customize the Extensible Web Part Menu. A summary of the properties and methods are provided in Table 5 and Table 6, respectively.

TABLE 5

Summary of Properties associated with the MenuItemCollection Object.

| Property | Type | Description |
|---|---|---|
| Count | Int | The number of MenuItem objects in the collection |
| Item[int index] | MenuItem | Returns the MenuItem at the specified indexed location in the collection. |

TABLE 6

Summary of Methods associated with the MenuItemCollection Object.

| Method | Description |
|---|---|
| Add(MenuItem) | Adds a previously created MenuItem to the end of the current Extensible Web Part Menu. |
| Insert(Int, MenuItem) | Adds a previously created MenuItem at the specified index within the menu item collection. |
| GetEnumerator( ) | Returns an enumerator that can iterate through the menu item collection. |
| CopyTo(MenuItem[ ], int) | Copies the entire menu item collection into a one-dimensional array starting at the specified index. |
| AddRange(MenuItem[ ]) | Adds an array of previously created MenuItem objects to the menu item collection. |
| Clear | Removes all MenuItem objects from the menu item collection. |
| Contains(MenuItem) | Determines if the specified MenuItem is a member of the menu item collection. |
| IndexOf(MenuItem) | Retrieves the first index of a specific MenuItem in the menu item collection. |
| Remove(MenuItem) | Removes the first instance of the specified MenuItem from the menu item collection. |
| RemoveAt(Int) | Removes the MenuItem from the menu item collection at the specified index. |
| ItemFromID(string) | Returns a MenuItem in a menu item collection, and all sub-menu item collections with an ID matching the parameter. Returns NULL if no such MenuItem exists. |
| Replace(MenuItem oldItem, MenuItem newItem) | Returns VOID. Replaces the first instance of the first MenuItem parameter with the second MenuItem parameter. If the first MenuItem parameter does not exist, then the second MenuItem parameter is added to the end of the Extensible Web Part Menu. |

Below is an example of an end-to-end scenario involving several property checks to add several commands to the Extensible Web Part Menu. The scenario creates three new commands, one of which is a parent command and two are child commands.

```
public override void CreateWebPartMenu( )
{
MenuItem ParentItem, Item1, Item2;
//first create three menu items
//one as a parent item, and two submenu items
//create the parent item
ParentItem = new MenuItem("ParentItem", " ", "Parent-
    ItemID");
//create a submenu item with a server event on click
Item1 = new MenuItem("Item1", "Item1ID", new
    EventHandler(EventHandlerForItem1));
//create a submenu item with a client event on click
Item2 = new MenuItem("Item2", "javascript:alert('Item2
    was clicked');", "Item2ID");
// add the submenu items to the parent item.
ParentItem.MenuItems.Add(Item1);
ParentItem.MenuItems.Add(Item2);
// add the parent item after the
// "Edit Web Part Properties" item in the menu.
// first find the index of the "Edit" item
int EditIndex =
this.WebPartMenu.MenuItems.IndexOf(this.WebPart-
    Menu.MenuItems.ItemFromID("MSOMenu _Edit"));
// then insert the parent item after the "Edit" item
this.WebPartMenu.MenuItems.Insert(EditIndex + 1,
    ParentItem);
// make sure the parent item has a separator above it
ParentItem.BeginSection = true;
// check a custom property to decide whether to display the
    parent menu
if (this.CustomProperty1 == true)
{
ParentItem.Visible = true;
}
else
{
ParentItem.Visible = false;
}
// check another custom property to decide which menu
    item to enable
// within the parent item
if (this.CustomProperty2 == true)
{
Item1.Enabled=true;
Item2.Enabled=false;
}
else
{
Item1.Enabled=false;
Item2.Enabled=true;
}
}
```

The code is then passed to the Web Part on the Web portal page where it is rendered in a manner that is completely integrated into the rest of the Web Part on the portal page to display the newly created commands.

Turning now to the figures, in which like numerals refer to like elements through the several figures, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
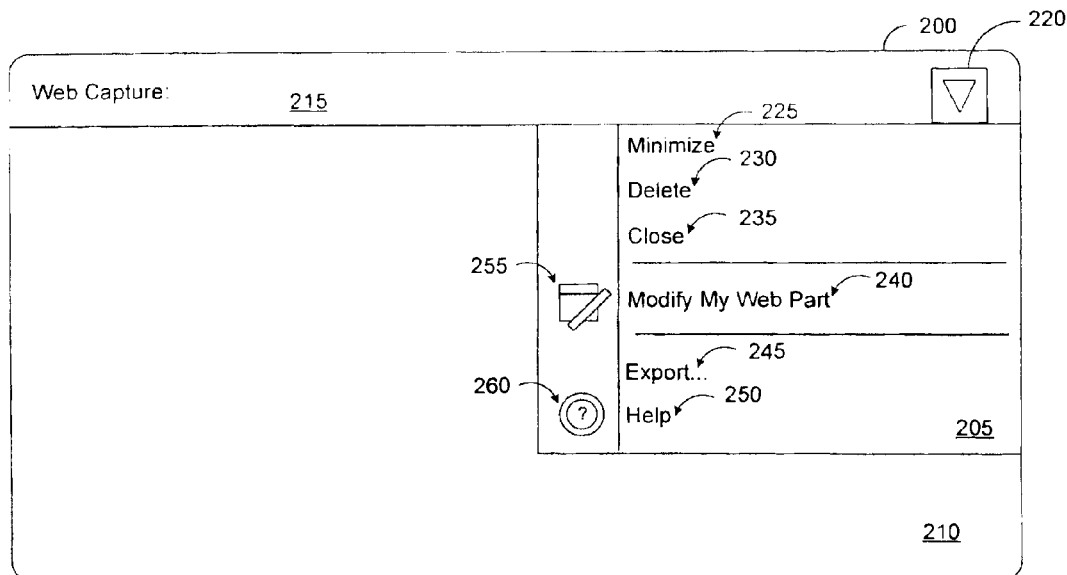
FIG. 2 is an illustration of a screen shot showing a Web Part with an Extensible Menu listing the default menu commands.

FIG. 2 is an illustration of a screen shot showing a Web Part 200, which contains an Extensible Web Part Menu 205. The Web Part 200 contains a display area 210, which may be used to display content, such as objects, text, images, and the like. The Web Part 200 also contains a title bar 215 for displaying a caption which describes the Web Part 200 type and the content currently displayed in the display area 210. For purposes of this application, the Web Part 200 will be described as a Web Capture Web Part and therefore, the term "Web Capture" appears in the title bar 215. It should be apparent to those skilled in the art that other types of Web Parts may be displayed in the Web Part 200. For example, if the Web Part 200 was a link Web Part, the title bar 215 would contain the term "Link." Similarly, if the Web Part 200 was a search Web Part, the title bar 215 would similarly contain the term "Search."

The Extensible Web Part Menu 205 is displayed by selecting the icon 220 using a standard pointing device, such as a mouse, stylus, keyboard, and the like. Upon selecting the icon 220, the Extensible Web Part Menu 205 appears as a "drop-down" window over the display area 210. The Extensible Web Part Menu 205 looks and behaves, other than the commands displayed, exactly as a standard menu in a Web Part Page header. The Extensible Web Part Menu 205 contains a set of default commands, which are displayed for each Web Part 200. In the present invention, the default commands are a MINIMIZE (or RESTORE command if the Web Part 200 is minimized) command 225, a DELETE command 230 (which is only displayed in the design mode), a CLOSE command 235, a MODIFY MY WEB PART command 240, an EXPORT command 245, and a HELP command 250.

Additionally, Web Part developers may also include icons associated with the menu commands. For Example, in the default Extensible Web Menu 205, for the Web Capture Web Part, the MODIFY MY WEB PART command 240 has an icon 255 associated with it. In the present invention, the icon 255, is an image of a window and a ruler. Similarly, the HELP command 250 also has an icon 260 associated with it, which in the present invention is an image of a question mark contained in a circle.

The Web Part developers are able to leverage the discoverability of the Extensible Web Part Menu 205 by adding commands that are custom suited to the particular Web Part 200. For example, if the Web Part 200 was a Search Web Part, the Web Part developer could add a "New Search" command to the Extensible Web Part Menu 205, which would display the original search window in the display area. Similarly, if the Web Part 200 was a Map Web Part that contained a map of a city street, from a mapping application program, such as the Microsoft® Streets and Trips application program, the Web Part developer could display a "Zoom In" command and a "Zoom Out" command inside the Extensible Web Part Menu 205.

Figure 3:
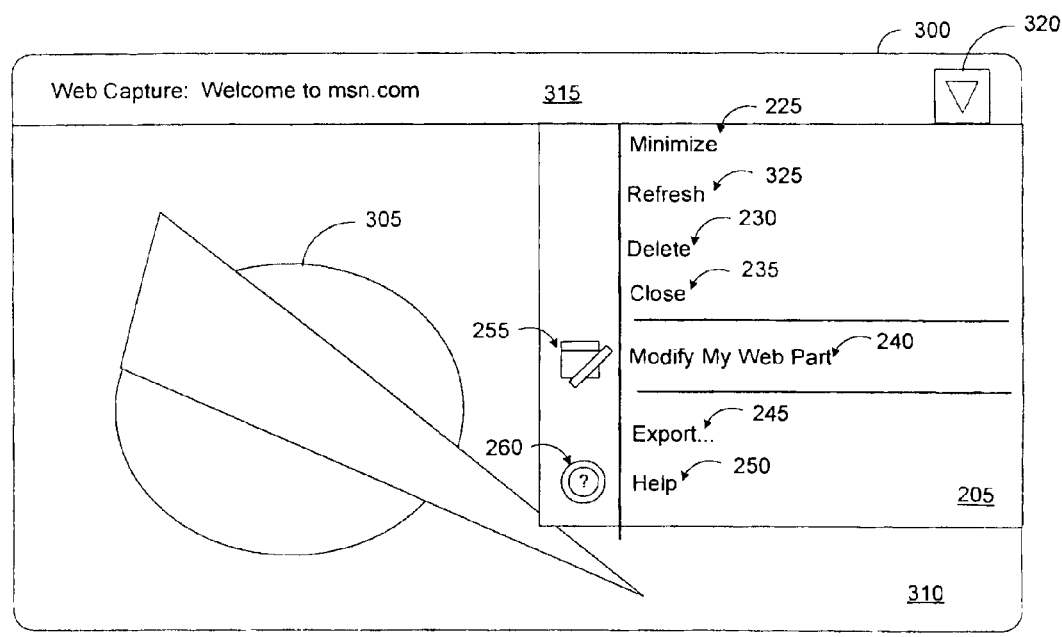
FIG. 3 is an illustration of a screen shot showing a Web Part Extensible Menu after customization of the menu commands in accordance with the present invention.

FIG. 3 is an illustration of a screen shot of a Web Part 200, which contains a dynamic object 305 displayed in the display area 210, which has been captured from a target Web page on a remote server. The title bar 215 has been modified to include the term "Web Capture: Welcome to msn.com," where the term "Web Capture" describes the type of Web Part and the term "Welcome to msn.com" is the title of the Web page where the dynamic object 305 originated. Because the dynamic object 305 can be updated, the default Extensible Web Part Menu 205 (FIG. 2) has been modified to include a REFRESH command 315, which is shown in the modified Extensible Web Part Menu 310. The REFRESH command 315 allows the user to update the content of the dynamic object from the target Web page. The REFRESH command 315 was added to the default Extensible Web Part Menu 205 by the Web Part developer by adding the following C# code to the Web Part object model on the server platform:

```
//-------------------------------------------------------------------
/// <summary>
/// Overridden method responsible for creating the web
    part menu for this part.
/// Method responsible for creating the web part menu
    for this part.
/// </summary>
//-------------------------------------------------------------------
public override void CreateWebPartMenu( )
}
// use ID in case position of webpart changes when
    switching between
// personal and shared view.
string refreshMenuID = "SampleID";
EventHandler eventHandler = new EventHandler(Sam-
    pleWebPartRefreshEventHandler);
MenuItem SampieWebPartRefreshMenuItem = new
    MenuItem(
    "SampleString",
    refreshMenuID,
    eventhandler);
// --- Add the refresh option to the web part menu --- //
if(WebPartMenu.MenuItems.Count > 2)
{
    WebPartMenu.MenuItems.Insert(2, SampleWebPar-
        tRefreshMenuItem);
}
else
{
    WebPartMenu.MenuItems.Insert(0, SampleWebPar-
        tRefreshMenuItem);
}
}
```

The C# code inserted the REFRESH command 310 into the second position in the Extensible Web Part Menu 200 using the Index numbers of the MenuItems command using the following line of code:

WebPartMenu.MenuItems,Insert(2, Sample WebPartRefreshMenuItem)

where WebPartMenu is the name of the Extensible Web Part Menu 205, and Insert(2, Sample WebPartRefreshMenuItem) is the method to insert the command at the second position in the menu.

Figure 4:
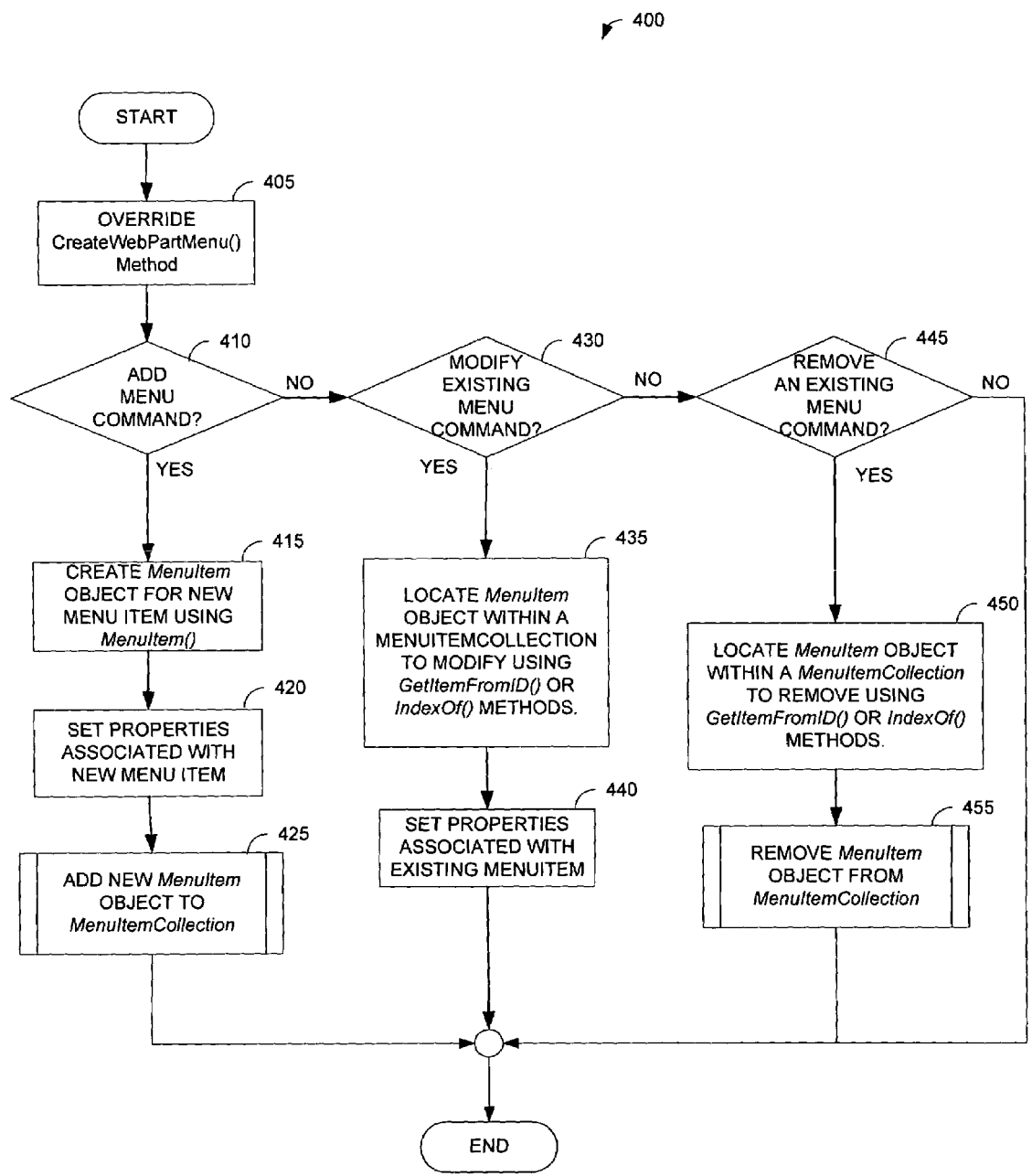
FIG. 4 is a logic flow diagram illustrating a routine for customizing the Web Part Extensible Menu in accordance with the present invention.

FIG. 4 is a logic flow diagram illustrating routine 400 for customizing an Extensible Web Part Menu 205. Routine 400 begins at 405, in which the Web Part developer begins to customized the Extensible Web Part Menu 205 by overriding the overriding the CreateWebPartMenu( ) method, which is used to create the Extensible Web Part Menu 205. For example, the Web Part developer may insert the following C# code to override the CreateWebPartMenu( ) method:

public override void CreateWebPartMenu( )

Overriding the CreateWebPartMenu( ) method does not overwrite the default Extensible Web Part Menu 205. Rather the override function allows the Web Part developer to insert the appropriate calls to the CreateWebPartMenu( ) method to either alter the characteristics of the existing command, add additional commands, or delete existing commands from the Extensible Web Part Menu 205. The calls included after the public override void CreateWebPartMenu( ) method are used in conjunction with the CreateWebPartMenu( ) method to render the customized Extensible Web Part Menu 205. For instance, when the customized Extensible Web Part Menu 305 is rendered in a Web Part, the CreateWebPartMenu( ) method is first called to render the default Extensible Web Part Menu 205. Then, if the public override void CreateWebPartMenu( ) method is encountered, any calls located within the public override void CreateWebPartMenu( ) method will be used to modify the default menu. For instance, the Web Part developer may include methods to add new commands, and to delete or modify existing commands listed in the default Web Part Menu 205.

At 410, a determination is made whether the Web Part developer want to either add a new menu command to the Extensible Web Part Menu 205 or delete an existing command from the Extensible Web Part Menu 205. If the Web Part developer wants to add a new menu item, then the "YES" branch is followed to 415, where a new menu command is created using a MenuItem object. The MenuItem object can be created using the following methods:

MenuItem(displayText, MenuID, OnClick);

MenuItem(displayText, ClientEvent); or

MenuItem(displayText, ClientEvent, MenuID)

where displayText, MenuId, OnClick, and ClientEvent are variables that are used to characterize and identify the particular menu command. Specifically, the displayText variable is a string that identifies the name of the command as it appears in the Extensible Web Part Menu. The MenuID property is a string that identifies a unique identifier for the command. The ClientEvent is a string, which is downloaded to Web portal page upon the execution of the event handler and is executed when the menu option is clicked. The OnClick variable is an event handler that is executed on the server when the user clicks on the command using the left button on a pointing device, such as a mouse. For example, if a Web Part developer wanted to create a new command called "NEW-COMMAND" with a MenuID value of "SampleID", the Web Part Developer may use the following method:

MenuItem("NEWCOMMAND", SampleID, OnClick)

Once the new command has been created, the Web Part developer sets the appropriate properties associated with the newly created command at 420. For each command, there are a number of "standard" properties available to alter the characteristics of the particular command. The "standard" properties may include but are not limited to: an Enabled property, a Visible property, a MenuItems property, an IsParent property, a Checked property, a Caption property, a BeginSection property, a MenuID property, and a ClientEvent property. Each of these properties are discussed in detail below.

The Enabled property is a Boolean variable that allows the Web Part developer to either enable or disable the command. When the Enabled property is set to "true," the command is enabled and available for selection by the user. However, when the Enabled property is set to "false," the command is unavailable for selection. The default value for the Enabled property is set to "true."

Another property associated with each command is the Visible property. The Visible property is a Boolean value and is used to indicate whether the command will be visible to the user on the Extensible Web Part Menu 205. If the Visible property is set to the Boolean value "true," then the command is visible on the Extensible Web Part Menu 205. If the Visible property is set to "false," then the command is not displayed on the Extensible Web Part Menu 205. The default value for the Visible property is "true."

Yet another standard property is the IsParent property. The IsParent property is a Boolean value that indicates whether the command stands by itself or has a sub-menu associated with it. Therefore, when the IsParent property contains the value "true," the command has a sub-menu with at least one child command associated with it, which is indicated by identifying indicia, such as an icon or arrow, which is located proximate to the command. When the user selects a command with the IsParent property set to "true" the sub-menu will be displayed with the appropriate child commands. The default value for the IsParent property is "false." Thus, the default is to have each command stand alone, without having a sub-menu attached to it.

The Checked property is a Boolean value and is used to place an icon, such as a check mark, next to the command in the Extensible Web Part Menu 205 whenever that particular command is selected.

The Caption property is string that is used to indicate the caption associated with the particular command. The value of the Caption property is the name of the command that is displayed in the Extensible Web Part Menu 205.

The BeginSection property is a Boolean variable that is used to display a separator immediately above the command in the Extensible Web Part Menu 205. The BeginSection property is typically used to logically section off similar commands within a given Extensible Web Part Menu 205. If the BeginSection property value is set to "true," then when Web Part is rendered, a separator is displayed immediately above the menu command. The default value for the BeginSection property is "false" so that all of the commands are initially placed in a single grouping.

Once the appropriate properties for the newly created menu command have been set, the new command is added to the Extensible Web Part Menu 205 at 425. To add the new command, the Web Part developer places the MenuItem( ) object for the new command into the public override void CreateWebPartMenu( ) object. At this point, the MenuItem( ) is associated with the MenuItemCollection object for the Extensible Web Part Menu 205, so that command will be displayed when the Extensible Web Part Menu 205 is rendered in the Web Part Page.

Returning to 410, if the determination is made not to add a new menu command to the Extensible Web Part Menu 205, the "NO" branch is followed to 430, in which the determination is made whether the Web Part developer wants to modify the characteristics of an existing menu command. If the determination is made that the Web Part developer wants to modify an existing menu command, then the "YES" branch is followed to 435. At 435 the existing menu command is located within the MenuItemCollection object. One of two methods may be used to locate the menu command depending on how each of the menu commands is indexed within the MenuItemCollection object. If a menu commands are indexed using MenuIDs, then the position of the menu commands may be determined using the GetItemFromID( ) method, which has the form:

GetItemFromID(MenuID)

where MenuID is the ID of the menu command. Alternatively, the position of the command may be determined using the Index associated with the command. In this instance, the IndexOf( ) method may be used to locate the menu command to modify. The IndexOf( ) method has the form:

IndexOf(Index)

where Index is the relative index number of the particular menu command the Web developer wants to modify.

Once the position of the appropriate menu command has been located, the Web Part developer may set the appropriate properties at 440 to modify menu command in the way the Web Part developer desires, such as changing the name of the menu command, determining whether a check mark should be displayed, and so forth. Alternatively, the Web Part developer may modify the command by creating a brand new property. For example, the Web Part developer may want to change the font, the font color, or the like of a particular menu item to distinguish it from the other menu commands on the Extensible Web Part Menu 205.

Returning to 430, if the determination is made that the Web Part developer does not want to modify the characteristics of any existing menu command, then the "NO" branch is followed to 445, in which the determination is made whether the Web Part developer wants to remove an existing menu command from the Extensible Web Part Menu 205. If the determination is made to remove an existing menu command, then the "YES" branch is followed to 450, in which the menu command to remove is located within the MenuItemCollection object using the either the GetItemFromID( ) method or the IndexOf( ) method described above. At 455 the Web Part developer removes the unwanted item from the Extensible Web Part Menu 205 by inserting an appropriate call (described below) in the public override void CreateWebPartMenu( ).

Figure 5:
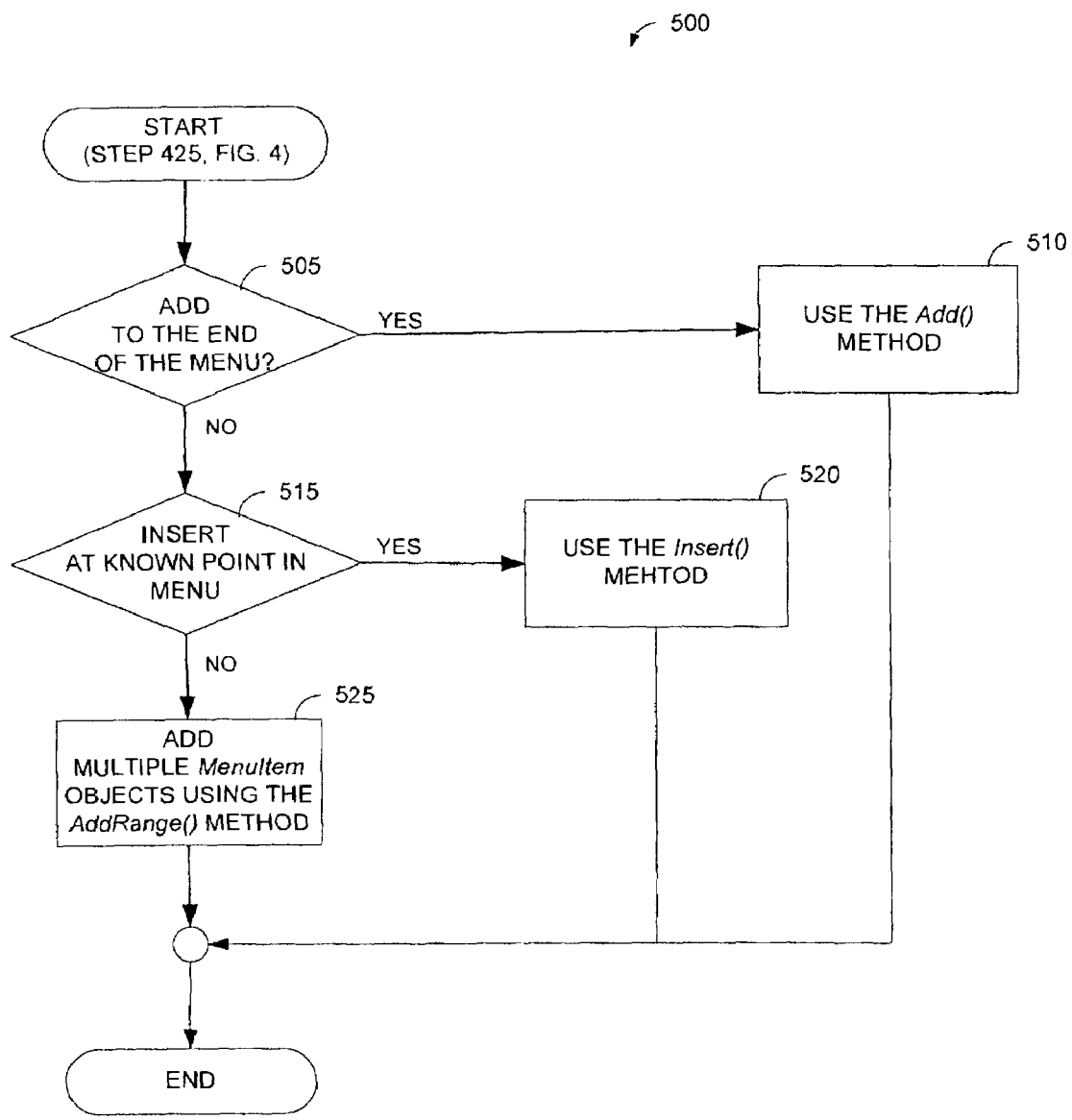
FIG. 5 is a logic flow diagram illustrating a routine for adding new commands to the Extensible Web Part Menu.

FIG. 5 is a logic flow diagram illustrating routine 500 from 425 (FIG. 4) for adding new menu commands to the Extensible Web Part Menu 205. Routine 500 begins at 505, in which the determination is made whether the Web Part developer wants to add the new command at the end of the Extensible Web Part Menu 205. If the Web Part developer decides that new command should be added to the end of the Extensible Web Part Menu 205, the "YES" branch is followed to 510, in which the new command is added by using the Add( ) method. The Add( ) method has the following form:

Add(MenuItem)

where MenuItem is the name of the new menu command the Web Part developer wants to add. The Add( ) method adds the created MenuItem to the end of the current Extensible Web Part Menu 205. It should be noted at this point that the Web Part developer may add a standard command, which is applicable to the application program, to the Extensible Web Part Menu 205, or the Web Part developer may add a brand new command, which he or she has created.

However, if the Web Part developer does not want to add the newly created menu command to the end of the Extensible Web Part Menu 205, the "NO" branch is followed to 515, in which the determination is whether the newly created menu command should be inserted at a known point in the current Extensible Web Part Menu 205. In some instances, it may be more appropriate to insert a newly created menu command next to a similar, existing command in the Extensible Web Part Menu 205 because it will appear in a more logical order for the user. If the determination is made to insert the newly created menu command at a certain location, then the "YES" branch is followed to 520, where the Web Part developer inserts the new menu command using the Insert( ) method. The Insert( ) method allows the Web Part developer to add a previously created menu command at a specified index within the MenuItemCollection object. The Insert( ) method has the form:

Insert(Int, MenuItem)

where Int is an integer value representing the specified index in the MenuItemCollection object where the menu command should be inserted. For example, if the Web Part developer created a new menu item called "Sample" and wanted to be the fourth menu command from the top of the Extensible Web Part Menu 205, the Web Part Developer may use the following code:

Insert (4, "Sample")

Figure 6:
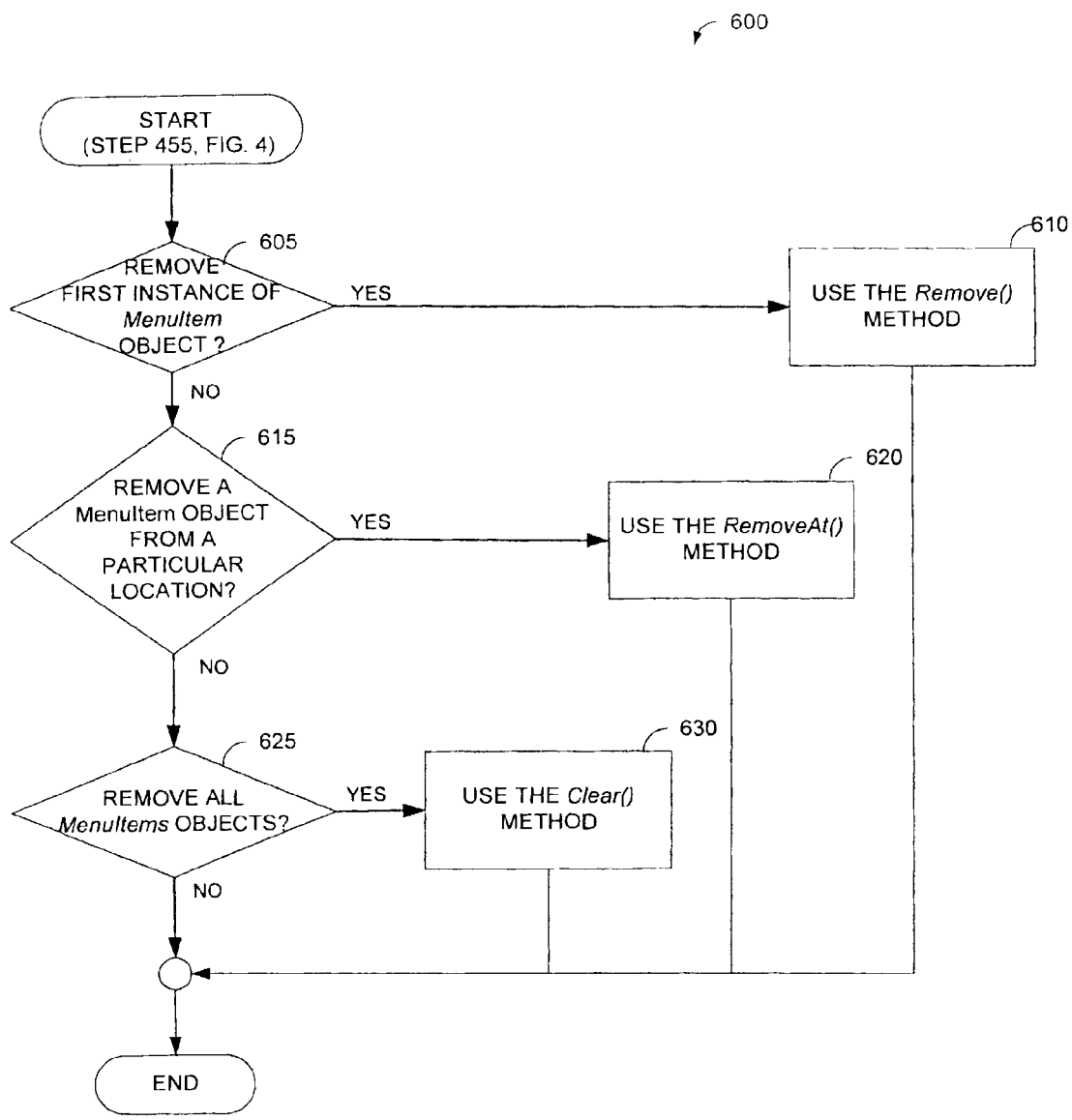
FIG. 6 is a logic flow diagram illustrating a routine for removing existing commands from the Extensible Web Part Menu.

If, however, at 515 the determination is made not to insert the newly created menu command at a know point in the Extensible Web Part Menu 205, then the "NO" branch is followed to 525, which is the final option for adding new menu commands. If the Web Part Developer does not want to add a single menu command, then the Web Part developer will typically want to add a group of menu commands that contain a number of related menu commands, to the Extensible Web Part Menu 205. In this instance, the Web Part developer may use the AddRange( ) method for inserting a group of menu commands. The AddRange( ) method adds an array of previously created MenuItem objects to the MenuItemCollection object to the end of the Extensible Web Part Menu 205. The AddRange( ) method has the following form:

AddRange(MenuItem[ ])

where MenuItem[ ] is an array of menu commands to be inserted into the Extensible Web Part Menu 205. This method may be used for quickly adding multiple commands to the MenuItemCollection( ). Additionally, it may also be used for adding a submenu to the Extensible Web Part Menu 205, which contains multiple subcommands FIG. 6 is a logic flow diagram illustrating a routine 600 from 455 (FIG. 4) for removing an existing menu command from an Extensible Web Part Menu 205. Routine 600 begins at 605, in which the determination is made to remove a single menu command from the Extensible Web Part Menu 205. If the determination is made to remove a single menu command from the menu, then the "YES" branch is followed to 610 where the Remove( ) method is used to eliminate the first instance of a particular menu command. The Remove( ) method has the following form:

Remove(MenuItem)

where MenuItem is the menu command to be removed. Any subsequent instances of the menu command will remain in the Extensible Web Part Menu 205. For example, a particular command may be located in the main, or "parent" Extensible Web Part Menu 205, and also as a child command under a "parent" menu command. In this case, using the Remove( ) method would delete the command from the main Extensible Web Part Menu 205, which is the first instance, and leave the duplicate "child" command unchanged.

Returning to 605, if the determination is made not the remove a single menu command, the "NO" branch is followed to 615, in which a second determination is made whether to remove a menu command from a particular location in the Extensible Web Part Menu 205. If the determination is made to remove a menu command from a particular location, then the "YES" branch is followed to 620 where the menu command is removed using the RemoveAt( ) method, which has the form:

RemoveAt(Int)

where Int is the index of the menu command to be removed from the MenuItemCollection. For example, if the Web Part developer wants to remove the REFRESH command 310 from the Extensible Web Part Menu 200 in FIG. 3, the Web Part developer may insert the following command:

WebPartMenu.MenuItems.RemoveAt(2);

where WebPartMenu specifies the menu on the Web page, and RemoveAt(2) indicates that the menu command, in this case the REFRESH command 310, located at the second index position should be removed.

Returning to 615, if the determination is made not to remove a menu command from a particular location in the Extensible Web Part Menu 205, the "NO" branch is followed to 625, where a third determination is made whether to remove all of the menu commands from the Extensible Web Part Menu 205, in which case the "YES" branch is followed to 630. At 630 the Web Part developer inserts a Clear( ) method into the Web Part code. The Clear( ) method removes every instance for all of the MenuItem objects from the Extensible Web Part Menu 205.

However, the DELETE command is prohibited from being removed from the Extensible Web Part Menu 205. This is a precaution to insure that unwanted or dangerous content, which may have been imported into the Web Part Page can still be removed. If the DELETE command is removed from the Extensible Web Part Menu 205 during customization, the object model will actually remove the DELETE command from the Extensible Web Part Menu 205. However, when the Web Part engine renders the customized Extensible Web Part Menu 205, the engine first checks to see whether the DELETE command was removed. If the DELETE command was removed, the Web Part engine will append the DELETE command to the end of the customized Extensible Web Part Menu 205. This ensures that the users of the Web Part Page will always have the ability to delete unwanted content from the Web Part Page.

Other alternative embodiments will become apparent to those skilled in the art to which an exemplary embodiment pertains without departing from its spirit and scope. Accordingly, the scope of the present invention is defined by the appended claims rather than the foregoing description.

We claim:

1. A method for customizing an Extensible Web Part Menu comprising a plurality of commands, wherein each command comprises a plurality of characteristics rendered in a Web Part, the method comprising:
    (a) overriding a method for rendering a default Extensible Web Part Menu in the Web Part, wherein overriding the method comprises:
        (a.1) calling a method to create a Web Part Menu, wherein the method is utilized to render a default Extensible Web Part Menu and;
        (a.2) determining whether a menu override method has been inserted, wherein the menu override method comprises at least one call which may be utilized to modify the default Extensible Web Part Menu, wherein the menu override method does not overwrite the default Extensible Web Part menu, wherein if it is determined that a menu override command has been inserted, then deleting at least one command from the Extensible Web Part Menu, wherein deleting at least one command comprises:
            (i) locating the command within an object model using at least one identifying indicia associated with the command; and
            (ii) removing the menu item from the command from the Extensible Web Part Menu, wherein removing the menu item from the command from the Extensible Web Part Menu comprises:
                (1) determining whether to remove the first instance of the menu command from the Extensible Web Part Menu, wherein the first instance of the menu command comprises a parent menu command located in the Extensible Web Part Menu, wherein a subsequent instance of the menu command comprises a child command located under the parent menu command, and wherein the child command is a duplicate of the parent menu command;
                (2) if the determination is made to remove the first instance of the menu command, then removing the parent menu command without removing the child command;
                (3) if the determination is made not to remove the first instance of the menu command, then making a determination whether the remove a menu item from a particular location in the Extensible Web Part Menu;
                (4) if the determination is made to remove the menu command from a particular location, then removing the menu command, wherein a DELETE command is prohibited from being removed from the Extensible Web Part Menu, thereby insuring the removal of unwanted or dangerous content imported into the Web Part using the DELETE command;
                (5) if the determination is made not to remove the menu command from a particular location, then removing all the menu commands from the Extensible Web Part Menu; and
    (b) rendering the customized Extensible Web Part menu in the Web Part in a Web page on a client platform.

2. The method of claim 1, further comprising performing at least one of:
    modifying at least one property associated with at least one command in the Extensible Web Part menu; or
    adding a new command to the Extensible Web Part Menu, wherein adding at least one command from the Extensible Web Part Menu comprises:
        inserting a new method associated with the new menu command;
        setting at least one property of a plurality of properties associated with the new menu command; and
        adding the new method to the Extensible Web Part Menu.

3. The method of claim 2, wherein adding the new method, comprises:
    (a) determining whether to add the new menu command to the end of the Extensible Web Part Menu;
    (b) the determination is made to add the menu command to the end of the Extensible Web Part Menu, then adding the new menu command to the end of the Extensible Web Part Menu;
    (c) if the determination is made not to add the menu command to the end of the Extensible Web Part Menu, then determining whether to insert the new menu command at a known point in the Extensible Web Part Menu;
    (d) if the determination is made to insert the menu command at a known point in the Extensible Web Part Menu, then inserting the new menu command in the Extensible Web Part Menu; and
    (e) if the determination is made to not to insert the menu command at a known point in the Extensible Web Part Menu, then adding multiple menu commands at the end of the Extensible Web Part Menu.

4. The method of claim 1, wherein the property is selected from a list comprising an Enabled property, a Visible property, a MenuItems property, an IsParent property, a Checked property, a Caption property, a BeginSection property, a MenuID property, and a ClientEvent property.

5. The method of claim 1, wherein inserting a new command comprises defining the new command, the comprising:
    inserting a MenuItem method associated with the new command, comprising:
        a first parameter for defining the name of the new command;
        a second parameter for providing a unique identifier for the new command; and
        a third parameter for identifying an event to determine whether the command should be activated.

6. The method of claim 1, wherein rendering the customized Extensible Web Part Menu, comprises:
    downloading the default Extensible Web Part Menu to the Web portal;
    downloading the new command for the Extensible Web Part Menu to the Web portal;
    assembling the default Extensible Web Part Menu and the customizations for the Extensible Web Part Menu; and
    displaying the assembled Extensible Web Part Menu in the Web Part on the Web portal.

7. A system for customizing a default Extensible Web Part Menu associated with a Web Part by adding commands specific to the functionality of the Web Part, the system comprising:
    (a) a memory unit operable for:
        storing an object model associated with the default Extensible Web Part;
    (b) a processing unit operable for:
        receiving program code for overriding a method for rendering the default Extensible Web Part Menu in the default Extensible Web Part, wherein overriding the method comprises:

(i) calling a method to create a Web Part Menu, wherein the method is utilized to render the default Extensible Web Part Menu;

(ii) determining whether a menu override method has been inserted, wherein the menu override method comprises at least one call which may be utilized to modify the default Extensible Web Part Menu, wherein the menu override method does not overwrite the default Extensible Web Part menu; and (iii) if it is determined that a menu override command has been inserted, then receiving inputs from an input device performing removing an existing command in the default Extensible Web Part Menu, wherein removing an existing command comprises deleting at least one command from the default Extensible Web Part Menu, wherein deleting at least one command comprises:

(1) locating the command within an object model using at least one identifying indicia associated with the command; and (2) removing a menu item from the command from the default Extensible Web Part Menu, wherein removing the menu item from the command from the default Extensible Web Part Menu comprises:

(2.1) determining whether to remove the first instance of the menu command from the default Extensible Web Part Menu, wherein the first instance of the menu command comprises a parent menu command located in the default Extensible Web Part Menu, wherein a subsequent instance of the menu command comprises a child command located under the parent menu command, and wherein the child command is a duplicate of the parent menu command;

(2.2) if the determination is made to remove the first instance of the menu command, then removing the parent menu command without removing the child command;

(2.3) if the determination is made not to remove the first instance of the menu command, then making a determination whether the remove a menu item from a particular location in the default Extensible Web Part Menu;

(2.4) if the determination is made to remove the menu command from a particular location, then removing the menu command, wherein a DELETE menu command is prohibited from being removed from the default Extensible Web Part Menu, thereby insuring the removal of unwanted or dangerous content imported into the Web Part using the DELETE command;

(2.5) if the determination is made not to remove the menu command from a particular location, then removing all the menu commands from the default Extensible Web Part Menu using a Clear method;

(3) transmitting the Extensible Web Part Menu and the new command to a Web portal page; and (4) assembling the Extensible Web Part Menu and the new command into a customized Extensible Web Part Menu; and (c) a display device operable for: displaying a Web Part; and rendering the customized Extensible Web Part Menu in the Web Part.

8. The system of claim 7, wherein receiving further inputs from an input device performing at least one of:

modifying at least one property associated with at least one command in the Extensible Web Part menu; or adding a new command to the Extensible Web Part Menu, wherein adding a new command further comprises defining the new command prior to adding the new command in the Extensible Web Part Menu.

9. The system of claim 8, wherein defining the new command, comprises:

receiving instructions from an input device to make a call to the object model comprising a MenuItem method, wherein the MenuItem method, comprises:

a first parameter for defining the name of the new command;

a second parameter for providing a unique identifier for the new command; and a third parameter for identifying an event to determine whether the command should be activated.

10. The system of claim 9, wherein the MenuItem method has a plurality of associated properties, which define how the new command is displayed in the customized Extensible Web Part Menu.

11. The system of claim 10, wherein the properties comprise an Enable property, a Visible property, a MenuItems property, an IsParent property, a Checked property, a Caption property, a BeginSection property, a MenuID property, and a ClientEvent property.

12. The system of claim 8, wherein adding the new command to the default Extensible Web Part Menu comprises:

inserting a new method associated with the new menu command into the object model;

setting at least one property of a plurality of properties associated with the new menu command; and adding the new method to object model.

13. The system of claim 8, wherein adding the new method, further comprises:

(a) determining whether to add the new menu command to the end of the default Extensible Web Part Menu;

(b) if the determination is made to add the menu command to the end of the default Extensible Web Part Menu, then adding the new menu command to the end of the default Extensible Web Part Menu using an Add method;

(c) if the determination is made not to add the menu command to the end of the default Extensible Web Part Menu, then determining whether to insert the new menu command at a known point in the default Extensible Web Part Menu;

(d) if the determination is made to insert the menu command at a known point in the default Extensible Web Part Menu, then inserting the new menu command in the default Extensible Web Part Menu using an Insert method; and (e) if the determination is made to not to insert the menu command at a known point in the default Extensible Web Part Menu, then adding multiple menu commands at the end of the default Extensible Web Part Menu using an AddRange method.

14. A method for customizing an Extensible Web Part Menu comprising a plurality of commands, wherein each command comprises a plurality of characteristics rendered in a Web Part, the method comprising:

(a) overriding a method for rendering the Extensible Web Part Menu in the Web Part;

(b) performing deleting at least one command from the Extensible Web Part Menu, wherein deleting at least one menu command, comprises:

(i) locating the command within an object model using at least one identifying indicia associated with the command; and (ii) removing the menu item from the command from the Extensible Web Part Menu, wherein removing the menu command from the Extensible Web Part Menu, comprises:

(1) determining whether to remove the first instance of the menu command from the Extensible Web Part Menu, wherein the first instance of the menu command comprises a parent menu command located in the default Extensible Web Part Menu, wherein a subsequent instance of the menu command comprises a child command located under the parent menu command, and wherein the child command is a duplicate of the parent menu command;

(2) if the determination is made to remove the first instance of the menu command, then removing the menu command, removing the parent menu command without removing the child command;

(3) if the determination is made not to remove the first instance of the menu command, then making a determination whether the remove a menu item from a particular location in the Extensible Web Part Menu;

(4) if the determination is made to remove the menu command from a particular location, then removing the menu command, wherein a DELETE menu command is prohibited from being removed from the default Extensible Web Part Menu, thereby insuring the removal of unwanted or dangerous content imported into the Web Part using the DELETE command;

(5) if the determination is made not to remove the menu command from a particular location, then removing all the menu commands from the Extensible Web Part Menu; and (6) rendering the customized Extensible Web Part menu in the Web Part in a Web page on a client platform.

* * * * *